(No Model.)　　　　　　　　　　　　　　　　　　2 Sheets—Sheet 1.
J. BARNET.
DRILLING MACHINE.

No. 295,329.　　　　　　　　　　　Patented Mar. 18, 1884.

Witnesses:
Phil C. Dietrich
W. R. Heyworth

Inventor:
John Barnet
by
J. H. Alexander
Attorney.

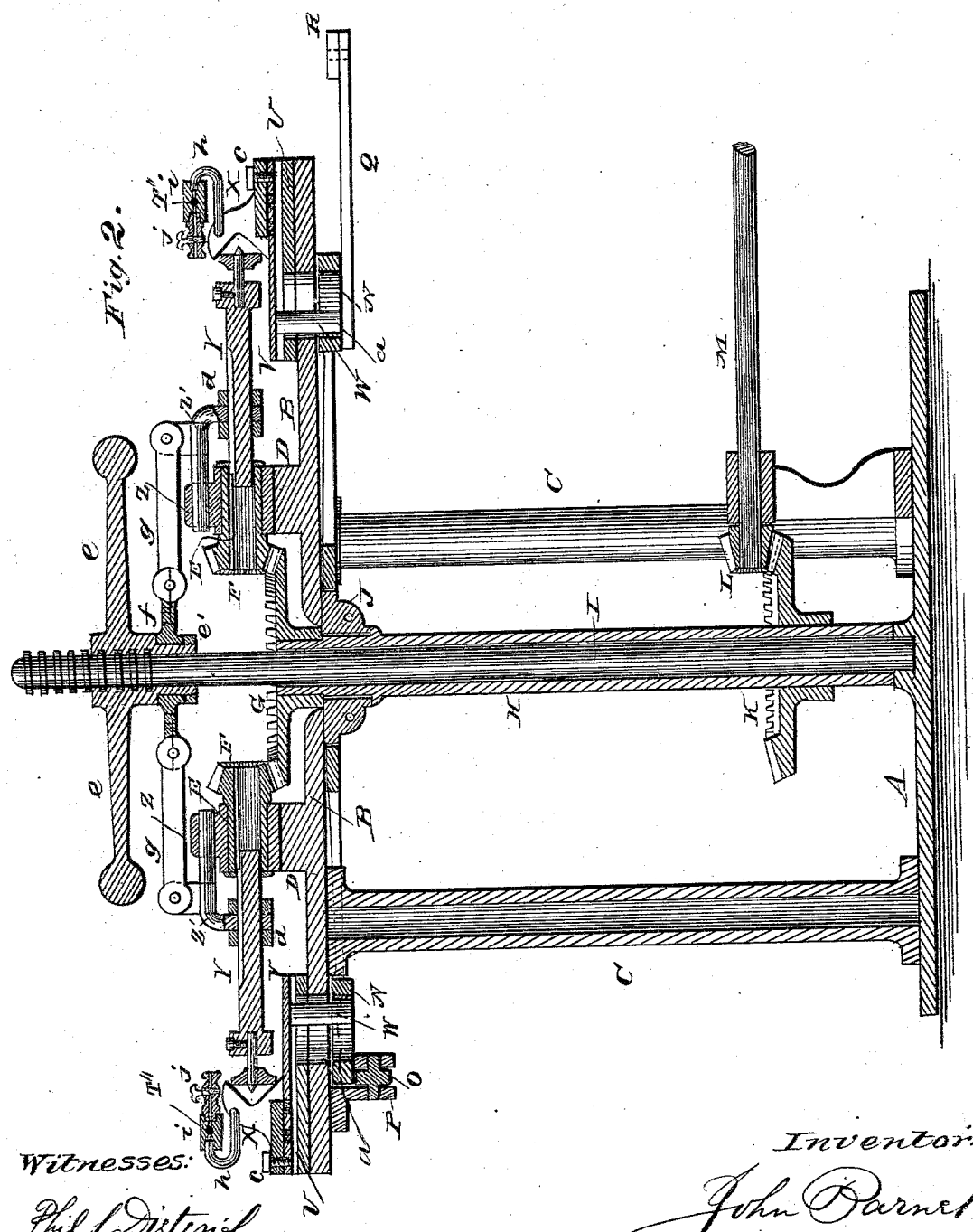

UNITED STATES PATENT OFFICE.

JOHN BARNET, OF LAFAYETTE, INDIANA.

DRILLING-MACHINE.

SPECIFICATION forming part of Letters Patent No. 295,329, dated March 18, 1884.

Application filed June 8, 1883. (No model.)

*To all whom it may concern:*

Be it known that I, JOHN BARNET, of Lafayette, in the county of Tippecanoe and State of Indiana, have invented certain new and useful Improvements in Drilling-Machines; and I do hereby declare that the following is a full, clear, and exact description thereof, reference being had to the accompanying drawings, and to the letters of reference marked thereon, which form part of this specification, in which—

Figure 1:
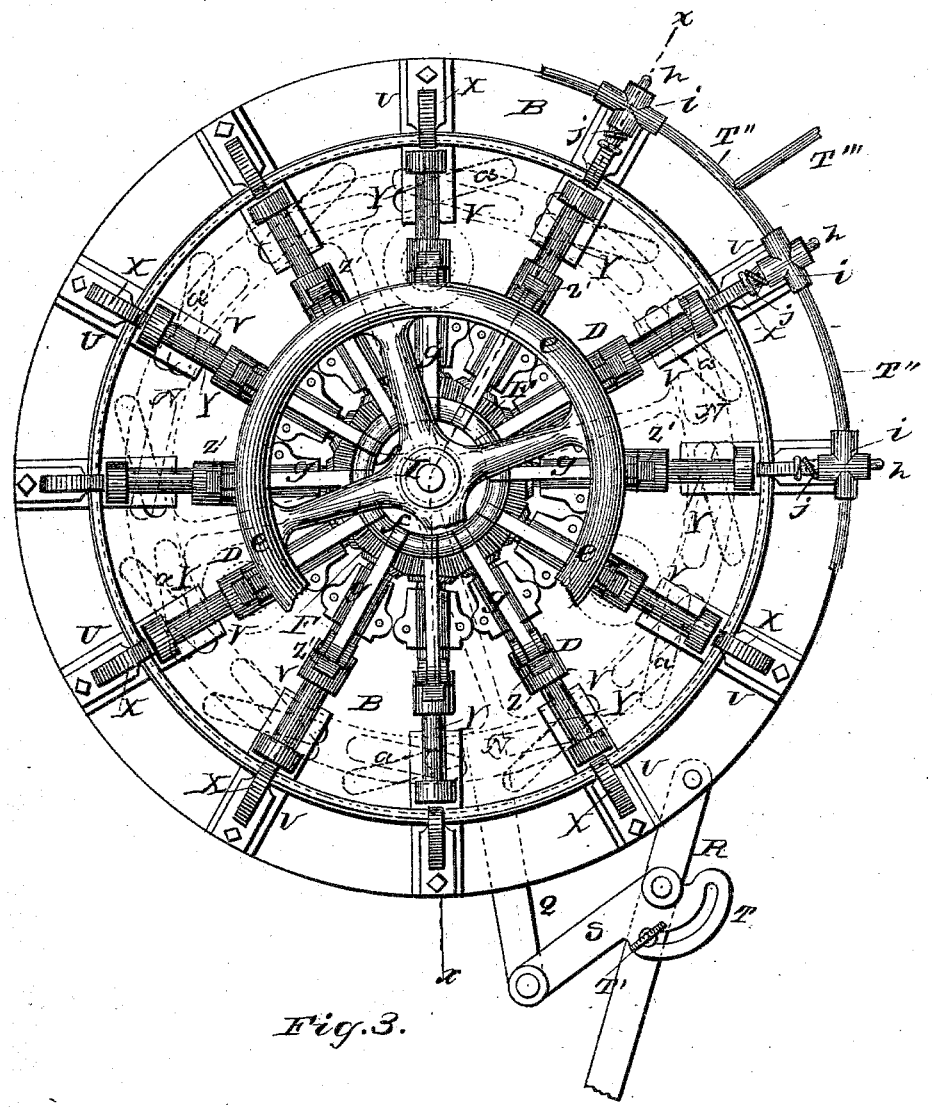
Figure 3:
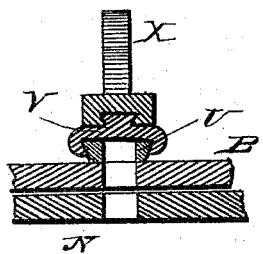

Figure 1 is a top view of the improved machine, part of the hand-wheel of which is broken away to show the devices beneath it. Fig. 2 is a section taken vertically and centrally through the machine in the plane indicated by the dotted line $x$ $x$ on Fig. 1. Fig. 3 is a sectional detail of the chuck.

This invention relates to improvements on machinery for drilling, spacing, centering, and chucking circular work, fellies, and ties or segments in the manufacture of wrought-iron or steel wheels for agricultural implements and other purposes; and it consists in the combination of radial drills with chucking and centering devices; also, in means for operating the drills and keeping their points cool during the operation of drilling; also, in certain other novel features, all of which will be fully understood from the following description, when taken in connection with the annexed drawings.

A designates the base or bed plate of the machine, and C C C strong columns, which are rigidly secured upon the bed-plate, and are also secured to a horizontal circular table, B.

On the table B are any desired number of bearings D, which are equidistant from each other, and also equidistant from the center of said table, in which bearings revolve sleeves E, having pinion spur-wheels F on their inner ends. The pinions F are driven by a bevel spur-wheel, G, which is keyed to a center sleeve, H, that surrounds an upright shaft, I, which is rigidly fixed into the center of bed-plate A, and passes through a bearing, J, which latter is rigidly secured to the plate B.

On the lower end of the sleeve H a bevel spur-wheel, K, is keyed, which is driven by a pinion, L, on a horizontal driving-shaft, M.

The table B is slotted as shown in Figs. 2 and 3, and underneath this table B is a slotted ring, N. (Shown in dotted lines, Fig. 1, and in full lines, Figs. 2 and 3.) This ring is provided with tangential slots $a$, and it is centrally bored and fitted to turn around the bearing J, which is supported by an annular bearing of pillow H, as shown in Fig. 2. This slotted ring N is supported at its outer part by rollers O, which are held by bracket-bearings P, secured to the bottom of the table B, only one of which bearings can be seen in Fig. 2. On the rim of this ring N is rigidly bolted a radial arm, Q, which is connected to a hand-lever, R, by a link, S, which link is adjustably attached to a slotted sector, T, by means of a thumb-screw, T'.

On the upper side of the table B are fixed radial and dovetailed slotted rests U, which are equidistant from each other and from the center of the table B, on which rests (or guides) slide chucks V, having V gripping-jaws X. These rests have pins W fixed into their bases, which pass freely through tangential slots made through the table B and into the slots $a$ of the ring N, the whole number of chucks being moved radially and simultaneously toward or from the center of the table B by vibrating the hand-lever R, above described.

On top of the sliding chucks V are the centering vise-jaws X, above referred to, which are held by set-bolts $c$, and made adjustable by means of different holes in the sliding chucks V.

The sleeves E are bored to receive spindles Y, which are driven by feather-keys and grooves in these spindles.

The caps of bearings D are provided with guides Z, into which a pusher, Z', is fitted. The outer ends of these pushers Z' encircle the spindles Y, and are made adjustable on the spindles by set-collars $d$.

On the hub of a wheel, $e$, is applied a loose link-ring, $f$, which is held in place by a collar, $e'$.

Attached to the link $f$ and to the pushers Z' are connecting-links $g$. It is thus obvious that by turning the hand-wheel $e$ on its screw-shaft I either an outward or inward movement will be given to all of the spindles Y.

On the jaws X are hinged or pivoted curved holders $h$, to the upper ends of which are secured cross-shaped couplings $i$, having cocks

*j*. These couplings are connected by hose T″, running continuously around the whole number, forming adjustable lubricators for the drills in spindles Y. When at work, a pipe, T‴, is connected to the hose T″, which pipe communicates with an elevated reservoir.

Operation: Circular work, fellies, tires, or segments are adjusted, one at a time, in the vise-chuck X, and by applying power to lever R the work is centered and spaced. Then, by turning the hand-wheel *e*, the drills held by spindles Y are forced into the work. At the same time the drills are lubricated through the cocks *j*. When the drills have completed their work, they are withdrawn by operating the hand-wheel *e*, and the work is released by reversing the movement of the lever R.

Instead of using cocks for injecting the lubricant upon the spindles when they are at work, I may employ a water-tight table adapted to hold the lubricant and submerge the work in the latter. I may also employ punches instead of drills, and perform the work of punching instead of drilling.

Having described my invention, what I claim as new, and desire to secure by Letters Patent, is—

1. The combination of the spindles arranged centrally on a table, the adjustable vise-chucks, and the mechanism for rotating the spindles and moving them endwise, and the hand-wheel on the vertical shaft, whereby the movement of said mechanism is controlled, substantially as specified.

2. The combination of the drill-spindles, the adjustable chucks, the screw-shaft with its hand-wheel, the link-ring and push-rods connected to the spindles, and the links connecting these rods to the said link-ring, all constructed and adapted to operate substantially in the manner and for the purposes described.

3. The combination of the adjustable vise-chucks, the dovetail guides U on table B, and pins projecting from said chucks and entering slots in a circularly-movable ring, N, and drilling-spindles, which are adjustable endwise by means described, controlled by a hand-wheel, all constructed and adapted to operate substantially in the manner and for the purposes described.

4. The combination of the endwise-adjustable spindles and adjustable chucks on a table, B, the centrally-fixed screw-shaft I, the hand screw-wheel *e*, and its connections with the spindles, the pinions F on sleeves, through which the spindles pass, and the bevel-gear on the sleeve which incloses the shaft I, all constructed and adapted to operate substantially in the manner and for the purposes described.

In testimony that I claim the foregoing as my own I affix my signature in presence of two witnesses.

JOHN BARNET.

Witnesses:
  B. F. BRUFF,
  JOHN OPP.